United States Patent
Deiss et al.

(10) Patent No.: US 7,434,745 B2
(45) Date of Patent: Oct. 14, 2008

(54) METHOD AND SYSTEM FOR PROVIDING TEMPERATURE-CONTROLLED WATER TO EMERGENCY SHOWER FACILITIES

(75) Inventors: Joseph L. Deiss, Portland, OR (US); Larry L. Thornton, Corvallis, OR (US)

(73) Assignee: CH2M Hill Industrial Design & Construction, Inc., Portland, OR (US)

( * ) Notice: Subject to any disclaimer, the term of this patent is extended or adjusted under 35 U.S.C. 154(b) by 554 days.

(21) Appl. No.: 11/138,122

(22) Filed: May 26, 2005

(65) Prior Publication Data
US 2005/0263606 A1      Dec. 1, 2005

Related U.S. Application Data

(60) Provisional application No. 60/574,475, filed on May 26, 2004.

(51) Int. Cl.
F25B 41/04        (2006.01)
A47K 3/022        (2006.01)
F25D 15/00        (2006.01)

(52) U.S. Cl. ............... 236/92 B; 4/598; 165/104.19; 165/104.28; 222/54; 137/340

(58) Field of Classification Search ............... 236/93 R, 236/93 B; 4/596, 598, 620; 165/104.11, 165/104.19, 104.28; 222/54; 137/240
See application file for complete search history.

(56) References Cited

U.S. PATENT DOCUMENTS

| | | | | |
|---|---|---|---|---|
| 3,521,704 A | * | 7/1970 | Bridegum | ............... 165/70 |
| 4,191,172 A | * | 3/1980 | Walch et al. | ............... 126/587 |
| 5,299,329 A | * | 4/1994 | Constantini | ............... 4/597 |
| 5,944,221 A | * | 8/1999 | Laing et al. | ............... 222/54 |
| 7,025,077 B2 | * | 4/2006 | Vogel | ............... 137/13 |

* cited by examiner

Primary Examiner—Marc E Norman
(74) Attorney, Agent, or Firm—Perkins Coie LLP

(57) ABSTRACT

A method and system for supplying temperature-controlled water to emergency shower and/or eyewash units ("SS/EWs"). In one embodiment, the water is circulated through a normally closed system containing a heat source such as a heat exchanger, a tank and pipes leading to the SS/EWs. Sensors in the system detect the temperature of the water and controllers regulate the amount of heat supplied to the heat exchanger to keep the temperature of the water in the system within a desired range of temperatures. A timer-controlled drainage subsystem periodically drains some or all of the water in the system. Water drained or supplied to the SS/EWs is made up by a cold water supply that feeds the heat exchanger. The system may use an alarm to signal water out of the desired temperature range, improper drainage, or water leaking from the system or being used by an SS/EW.

32 Claims, 4 Drawing Sheets

METHOD AND SYSTEM FOR PROVIDING TEMPERATURE-CONTROLLED WATER TO EMERGENCY SHOWER FACILITIES

CROSS REFERENCE TO RELATED APPLICATIONS

This application claims priority to U.S. Provisional Patent Application No. 60/574,475 entitled "METHOD AND SYSTEM FOR PROVIDING TEMPERATURE-CONTROLLED WATER TO EMERGENCY SHOWER FACILITIES", filed on May 26, 2004.

TECHNICAL FIELD

The present invention is related to water supply systems and more specifically to water supply systems to emergency showers/wash stations.

BACKGROUND

Chemicals may be stored in one location and used for processing at the same or different locations. Many facilities have emergency shower systems and/or eyewash units ("SS/EWs") near where the chemicals are stored, used or otherwise handled. The SS/EW allows an individual contaminated with chemicals to easily direct a spray of water at himself or herself to wash off the chemicals. Some SS/EWs provide a downward-facing shower head and a pulling lever that will start the flow of water out of the shower head to wash the chemicals off the contaminated person. SS/EWs can also have an upward-facing spray nozzle head and a paddle to start an upward flow of water, thereby washing the chemicals off the person's face and/or eyes. The SS/EW may also be actuated by a rescuer or other person to wash chemicals off a contaminated individual.

Water is frequently used in an SS/EW because water itself often will not act as a catalyst to speed up the reaction of the chemical with the individual's skin. It is highly desirable to provide water from the SS/EW within an ideal temperature range of 60 to 90 degrees Fahrenheit.

Dual faucet arrangements could be used to control the temperature of the water, but such arrangements may be difficult for a person to operate in a state of panic, pain or both. Thus, many conventional water supply systems for SS/EWs do not use such an arrangement. Instead, water supplies to SS/EWs may use a thermostatic mixing valve coupled to both a cold water supply and a hot water supply from a hot water heater to automatically control the temperature of the water dispensed from the SS/EW. A thermostatic mixing valve is supposed to mix the water from the two sources to achieve a preset temperature.

However, thermostatic mixing valves and the systems containing them are not well suited to water supply systems for SS/EWs for several reasons. One problem with thermostatic mixing valves is their period of thermal stabilization. There is a stabilization period when the water first starts flowing through a thermostatic mixing valve. During the stabilization period, the water may have a temperature that is outside the ideal temperature range. The stabilization period of a thermostatic mixing valve increases the longer the valve is not in use. Because SS/EWs may be rarely used, the stabilization period may become unacceptably long.

Another problem with thermostatic mixing valves is the amount of pressure required behind the valve for proper operation. If the pressure decreases behind the valve due to other demands of the source of hot or cold water simultaneous to use of the SS/EW, the thermostatic mixing valve may not operate properly.

Another problem with thermostatic mixing valves is their capacity. The valves operate properly only within a specified flow range that may not be able to supply adequate flow at the specified temperature for simultaneous operation of multiple SS/EWs. Multiple SS/EWs may be hooked to a single supply to supply several areas with multiple showers at a reasonable cost. In many circumstances, only one shower is operated at a time, well within the stable range of the thermostatic mixing valve. However, should the simultaneous operation of multiple showers be necessary, for example, in an accident where many people come into contact with chemicals or where a rescuer comes into contact with chemicals while placing an individual into one shower and needs to use a nearby shower, the valve may not be able to supply the multiple showers within the ideal temperature range.

One problem with systems using thermostatic mixing valves is that they may need to be custom built on-site by plumbers during construction of the facility in which the SS/EW is being installed. Custom building such systems is undesirable for several reasons. First, it is more expensive than premanufactured systems due to tradesmen's salaries and design costs. Second, it is difficult to achieve the level of quality in custom built systems possible in premanufactured systems because, the people building such systems may not have the experience building such systems that would be possible by a person in a factory. Further, a premanufactured system may be factory tested and inspected by a quality control engineer before it is shipped to the facility where it will be installed. Such testing may be more thorough than what might be expected of a tradesman in the field.

Another problem with systems using a thermostatic mixing valve is the delay before the temperature controlled water reaches the shower head of the SS/EW. Because the ambient temperature of the pipes between the thermostatic mixing valve and a shower head may be different than the ideal temperature of the water supplied by the thermostatic mixing valve, the water in the pipes between the valve and the shower head may be at a temperature outside the ideal temperature range. This is a particular problem for showers located outside the facility in which the valve is located, because the pipes leading to the shower head may be subjected to temperatures other than room temperature.

Some systems wrap the pipes subject to ambient temperatures below the ideal temperature range in heat trace, which can warm the pipes if the temperature ambient to the pipes becomes too cold. However, the failure of the heat trace can leave the water too cold, and if the thermostat controlling the temperature of the heat trace fails, the water in the pipes surrounded by the heat trace may get too cold or too hot.

Another problem with systems using a thermostatic mixing valve is the relative inefficiency of the water heater used to heat the water as compared with other sources of heat that may be available, such as hot water or steam from a central plant in the facility which the SS/EW system serves. The water in the heater is typically heated to 140 degrees Fahrenheit while sitting in an ambient temperature at or near room temperature. The water in the water heater loses heat to its environment, requiring additional energy to be expended to maintain its temperature at or near 140 degrees Fahrenheit.

SUMMARY

The present invention overcomes limitations of the prior art and provides additional benefits. A brief summary of some embodiments and aspects of the invention are presented. Thereafter, a detailed description of the illustrated embodiments is presented, which will permit one skilled in the relevant art to understand, make, and use aspects of the invention. One skilled in the relevant art can obtain a full appreciation of aspects of the invention from the subsequent detailed description, read together with the figures, and from the claims, which follow the detailed description.

In one embodiment of the invention, an emergency water-dispensing system is provided for providing temperature-controlled water to at least one dispensing head. The system connectable to a water source and a separate heat source. The system comprises a circulation portion having a water inlet connectable to the water source and a water outlet coupled to the dispensing head. A reservoir is intermediate the water inlet and the water outlet. The circulation portion is configured to circulate a substantially continuous flow of water therearound at a temperature in a selected range at least until a portion of the flow of water is delivered to the dispensing head. A heat portion is connectable to the heat source and is configured to contain a heated material independent of the water in the circulation portion.

A heat exchanger is connected to the heat portion and to a portion of the circulation portion upstream from the reservoir. The heat exchanger is configured to heat the flow of water moving therethrough with heat from the heated material without the flow of water mixing with the heated material and before the flow of water is delivered to the dispensing head. A controller is connected to the circulation portion and configured to control the flow of water through the circulation portion to maintain the temperature of the water in the range of temperatures.

Under another aspect of the invention, a method is provided for supplying water to SS/EW heads, the method comprises passing water near a heat source and removing the water from the heat source. Responsive to at least one SS/EW head activated, at least a portion of the water removed from the heat source is supplied to the at least one SS/EW head activated. Responsive to none of the SS/EW heads activated, the water is passed by the pipes supplying the SS/EW heads, and the water is recirculated near the heat source.

DETAILED DESCRIPTION

A method and system for supplying water to emergency shower and/or eyewash ("SS/EW") dispensing heads are described in detail herein in accordance with embodiments of the present invention. In the following description, numerous specific details are discussed to provide a thorough and enabling description for embodiments of the invention. One skilled in the relevant art, however, will recognize that the invention can be practiced without one or more of the specific details. In other instances, well-known structures or operations are not shown or are not described in detail to avoid obscuring aspects of the invention. In general, alternatives and alternate embodiments described herein are substantially similar to the previously described embodiments, and common elements are identified by the same reference numbers.

In at least one embodiment discussed in greater detail below, a method and system circulates water past a heat exchanger, through a tank and then through pipes coupled to SS/EW heads. The method and system maintains the temperature of the water supplied to the SS/EWs at an ideal temperature. The tank serves as a reservoir of water at a temperature within the ideal range to moderate any temperature changes. The heat exchanged by the heat exchanger is controlled by temperature sensors that sense the temperature of the circulated water, allowing the temperature of the water to be adjusted within the ideal temperature range.

Under one aspect of an embodiment, a drainage system periodically drains water from the system, preventing the growth of contaminants, particularly in the tank. Water supplied by the system is re-supplied by cold water, which passes through the heat exchanger in case warming is required. Alarms can be provided to signal if the water temperature in the system is out of the ideal range. Alarms can also be configured to signal the water is not being drained properly. The system may be premanufactured in a housing or on a skid, allowing high-quality manufacturing techniques to be used.

A more detailed description is provided below related to the hot and cold water supply, the water circulation and storage, the circulated and non-circulated water supply to the SS/EW heads, the drainage system, the operation and method, and other features.

A. Water Supply

Figure 1:
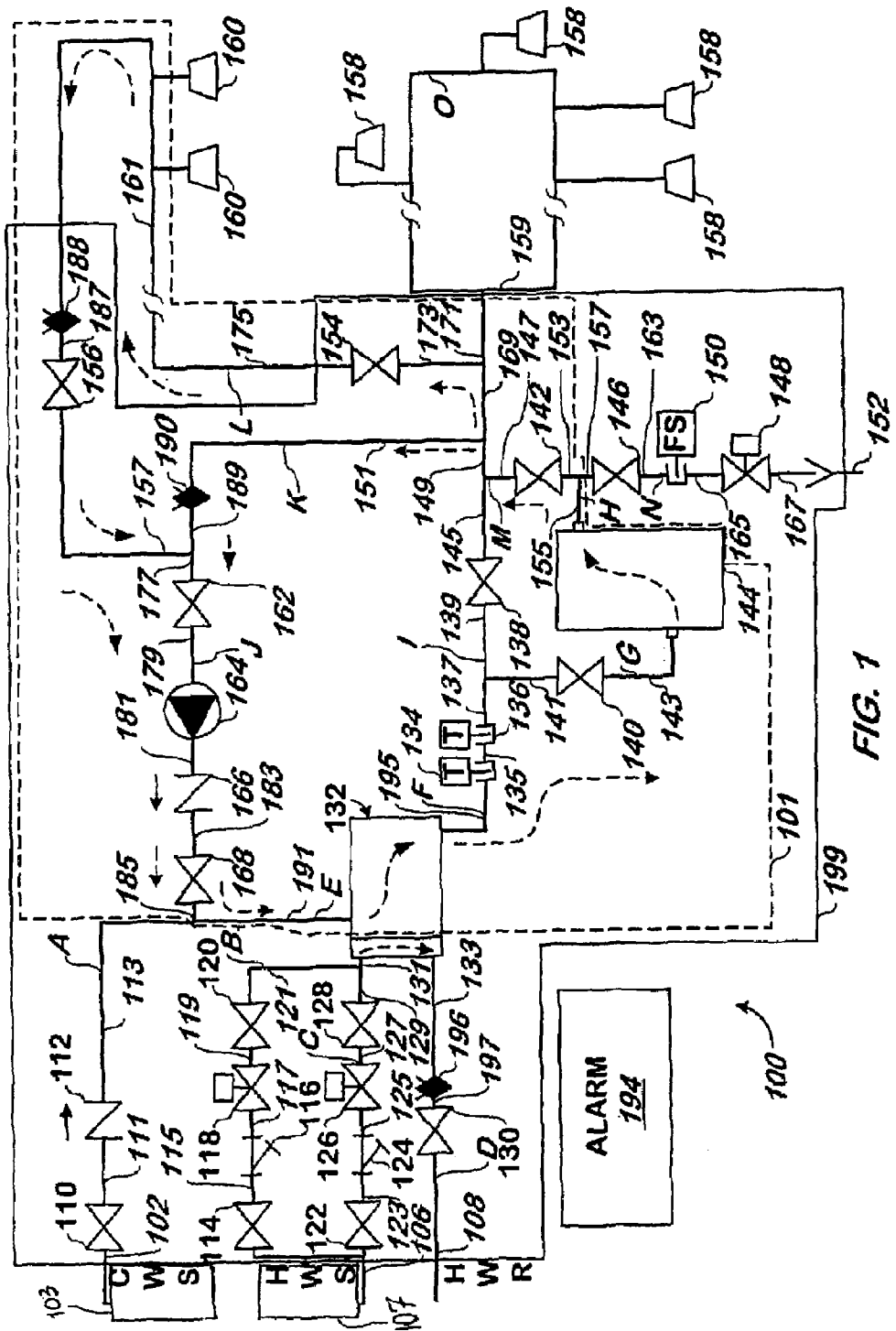
FIG. 1 is a block schematic diagram of a system for supplying water to emergency shower and/or eyewash system heads according to one embodiment of the present invention.

Referring now to FIG. 1, a system 100 for supplying water to SS/EW heads 158, 160 is shown according to one embodiment of the present invention. Water is supplied to the system 100 through a pipe 102 coupled to a cold water supply 103 connected to the end of branch A through a ball valve 110, which is normally open. In one embodiment, all ball valves in the system (discussed below) are lockable and locked in their normal positions to prevent accidental incorrect operation of the system 100. The system 100 of the illustrated embodiment has a plurality of branches, labeled A-O in FIGS. 1 and 2 for purposes of explanation. Each branch A-O is shown in the Figures as ending either an intersection with another branch or an endpoint of a line. Thus, branch A contains the pipe 102 coupled to the cold water supply 103, the normally open lockable ball valve 110, a cold water pipe 113, and all components in between them as discussed in greater detail below.

The ball valve 110 is normally open and lockable in this position and coupled via a pipe 111 to a check valve 112 that allows water to flow only in the direction of the arrow shown in FIG. 1 above the check valve 112. The cold water is carried from the check valve 112, through pipes 113 and 191 to a heat exchanger 132.

The heat exchanger 132 exchanges heat from hot water or steam carried by a pipe 106 coupled to a conventional hot water supply system 107 to water in a circulation portion 101 of the system 100 discussed in greater detail below. The hot water supply pipe 106 is connected to the heat exchanger 132 by means of two connected branches B and C. Branch B contains a normally open, lockable ball valve 114 coupled to a Y strainer 116 via a pipe 115. The Y strainer 116 strains sediment from the hot water supply pipe 106 to reduce the sediment reaching a control valve 118 downstream from the Y strainer 116. The control valve 118 is configured to fail to the closed position, and is connected to the Y strainer 116 via a pipe 117 and allows the supply of hot water through branch B to be controlled as described below. A, normally open, lockable ball valve 120 is connected to the control valve 118 via a pipe 119, which together with the, normally open, lockable ball valve 114, allows for isolation of the control valve 118 and the Y strainer 116 from the remainder of the system 100.

Branch C of the illustrated embodiment is very similar to branch B. Branch C contains two, normally open, lockable ball valves 122, 128, a Y strainer 124 and a control valve 126, each substantially identical to the lockable, normally open ball valves 114, 120, the Y strainer 116 and the control valve 118, respectively, in branch B, except that the control valve 126 has a larger capacity than the control valve 118. In one embodiment, the control valve 126 in branch C has twice the capacity of the control valve 118 in branch B. A plurality of pipes 123, 125, 127, 129 connect the components in branch C together similar to the pipes 115, 117, 119, 121, respectively, in branch B. Branches B and C supply hot water via a pipe 131 to the heat exchanger 132. The hot water supply pipe 106 accepts hot water, which may be supplied by a conventional central hot water plant that supplies hot water to other parts of the facility served by the system 100. In another embodiment, the hot water supply pipe 106 accepts steam, such as steam generated by a conventional central plant steam generator, which also supplies steam to other portions of the facility served by the system 100.

The hot water supplied by branches B and C as described in more detail below is passed through the heat exchanger 132 to a hot water return pipe 108. A normally open, lockable ball valve 130 can isolate the heat exchanger 132 from the hot water return pipe 108. A pipe 107 connects the heat exchanger 132 to a balancing valve 196, which is connected to the normally open, lockable ball valve 130 via a pipe 197. The balancing valve 196 can be a conventional "Circuit Setter" balancing valve manufactured by Bell & Gossett of Morton Grove, Ill. The balancing valve 196 is configured to balance the heating requirements of the system 100 with any other systems served by the central plant. The normally open, lockable ball valve 130 can serve to isolate the system 100 from the hot water return pipe 108.

The heat is transferred from the hot water or steam that enters the heat exchanger 132 at pipe 131 to the cold water that enters the heat exchanger 132 at pipe 191 discussed above. The water from pipe 191 flows through the heat exchanger 132 and in to branch F, wherein the water accepts some or any of the heat that may be flowing through the left portion of the heat exchanger 132 via the hot water or steam (and/or condensation from the steam) entering the heat exchanger 132 at pipe 131, and which leaves the left portion of the heat exchanger 132 via pipe 107. The heated water leaves the heat exchanger 132 through a pipe 195 in branch F. In one embodiment, the pipes are type K copper pipes manufactured by Elkhart Products Corp., Elkhart, Ind. or Mueller Brass Co., Port Huron, Mich. The ball valves are lockable ball valves manufactured by Watts Regulator, North Andover, Mass. or Conbraco Industries, Mathews, N.C. The check valves are manufactured by Pacific Valves, Division of Crane Valve Group, Long Beach, Calif. or Southwest Foundry-Stockham Div. Paris, Tex. The heat exchanger 132 is a double-wall, copper, shell and tube heat exchanger manufactured by Bell & Gossett "Diamondback,". ITT Bell & Gossett, Morton Grove, Ill. The Y-strainers of the illustrated embodiment are manufactured by Conbraco Industries of Mathews, N.C. or Watts Regulator of North Andover, Mass.

B. Circulation and Storage

The system 100 has a circulating pump 164 that circulates water in the direction of the arrowhead shown in the pump 164 in FIG. 1, through branch J, down through branch E, and through the heat exchanger 132. The water is pumped from the heat exchanger 132 through branch F, down through branch G, to a storage tank 144 discussed below. The water flows from the tank, 144 through branch H, through branch M, and up through branches K and L as indicated by the dashed arrows in FIG. 1 to complete the circulation of the water around a portion of the system 100. As water circulates through the heat exchanger 132, the water may be warmed to a desired temperature within a selected range. The pump 164 may contain a current switch across the recirculation pump motor to detect a loss in power, signaling a malfunction of the pump. The switch is connected to an alarm 194 to alert an operator of this power-loss condition. In one embodiment, the pump 164 is a pump having a model name of "Little Red," manufactured by Bell & Gossett of Morton Grove, Ill. Other embodiments can use other circulation pumps or devices.

In the illustrated embodiment, a temperature element/controller 134, coupled to the heat exchanger 132 by pipe 195, is coupled to control valves 118, 126 via a conventional connection not shown to avoid cluttering the Figure. In one embodiment, the temperature element/controller 134 is a single point controller with two dry contacts for high and low temperature alarms. The temperature element/controller 134 is manufactured by Johnson Controls, Inc. of Milwaukee, Wis. or Honeywell Corp., Industrial Automation & Control Div., of Fort Washington, Pa. The control valves 118, 126 in the illustrated embodiment are two-way, modulating, pneumatic control valves (with positioners), that fail to the closed position. These valves are manufactured by H.D. Baumann Assoc., Ltd. of Portsmouth, N.H.; or Fischer Controls of Marshalltown, Iowa or Neles-Jamesbury of Worcester, Mass. The temperature/controller element 134 contains a temperature element to sense the temperature of the water flowing through branch F, and signal the controller in the temperature/controller element 134 about the temperature detected in the water by use of an electrical signal.

The controller in the temperature element/controller 134 is programmable to modulate each of the control valves 118, 126 over a range of closed to open in a continuous manner in response to the temperature of the water detected by the temperature element/controller 134, in order to maintain the water in the circulation portion 101 of the system 100 within an ideal temperature range. The ideal temperature range may be approximately 60 to approximately 90 degrees Fahrenheit in one embodiment, but may be other ranges, such as approximately 67 to approximately 73 degrees Fahrenheit, depending on the chemicals used in the facility served by the system 100. The water in the system 100 is not heated to a temperature above the high threshold in the ideal range. Instead the water is heated to and maintained at a temperature within the ideal range. Accordingly, the system 100 does not heat the water above the high threshold and then require a mixing valve to introduce cold water into the system to cool the water that will be delivered from the shower heads 158, 160 to a temperature within the ideal range. The system 100, thus, eliminates the need for a mixing valve, and thereby eliminates a potential point of system failure.

In one embodiment, the controller in the temperature element/controller 134 is programmed so the control valve 118 will be fully closed when the water at the temperature element of the temperature element/controller, 134 is just above approximately 71 degrees Fahrenheit, the high threshold for the control valve 118. As the water temperature falls under that high threshold temperature, the control valve 118 will be opened slightly, and the farther under the high threshold for the control valve 118 the water temperature is, as detected by the temperature element of the temperature element/controller 134, the more the control valve 118 is opened by the controller. When the water temperature reaches approximately 69 degrees Fahrenheit, the low threshold for the control valve 118, the valve 118 is fully opened. The control valve 118 remains fully open when the water temperature, as detected by the temperature element of the temperature element/controller 134, is below the low threshold for the control valve 118. The controller of the temperature element/controller 134 also modulates the valve 126 in the same manner between a high threshold temperature of approximately 73 degrees Fahrenheit and a low threshold temperature of approximately 67 degrees Fahrenheit. Other temperatures may be used for the various thresholds.

The controller of the temperature element/controller 134 also serves to provide alarms when the temperature sensor of the temperature element/controller 134 is at or outside two thresholds. At temperatures under approximately 65 degrees or over approximately 75 degrees Fahrenheit, the controller of the temperature element/controller 134 will signal the alarm 194 via a conventional connection, not shown to avoid cluttering the Figure. The alarm 194 may be located at a security guard station, so that corrective measures may be undertaken.

A second temperature element/controller 136 serves as a safety controller, in case the above alarm is not heeded in the overheated condition above approximately 75 degrees Fahrenheit. The temperature element of the second temperature element/controller 136 signals the controller of the temperature element/controller 136 with the temperature of the water it detects. If the water at the temperature element of the second temperature element/controller 136 rises above approximately 80 degrees Fahrenheit, the controller of the temperature element/controller 136 disables the source of power to the control valves 118, 126 in branches B and C. Because the control valves 118, 126 fail to the closed position, the valves will shut off, cutting the flow of heat (via the hot water from the hot water source 107) to the heat exchanger 132. The temperature element/controller 136 is coupled to the temperature element/controller 134 via a pipe 135, and is coupled to an inlet of the tank 144 via pipes 137, 141, a normally open, lockable ball valve 140, and a pipe 143 as illustrated in FIG. 1 along branches F and G.

In one embodiment, the tank 144 is a stainless steel tank which stores up to 200 gallons of water, although other capacities may be used. The tank 144 of the illustrated embodiment is a 304L stainless steel tank manufactured by Cemline Corporation of Cheswick, Pa.; or Orbit Industries of Washougal, Wash. and/or Wenlund Manufacturing Company, of San Angelo, Tex. The tank 144 dampens any fluctuation in temperature of the water in the system 100 by absorbing temperature variations. The stainless steel construction of the tank 144 inhibits the growth of contaminants, such as *Legionella* bacteria. An outlet of the tank 144 is coupled to branch H that includes a pipe 155 and branch M that includes a pipe 153, a normally open, lockable ball valve 142, and pipes 147, 149. The normally open, lockable ball valves 140, 142 allow isolation of the tank 144, for example, for maintenance purposes. In one embodiment, a lockable ball valve 138 in branch I is normally closed (and locked in this position), but may be opened when the normally open, lockable ball valves 140, 142 are closed. Opening the ball valve 138 provides a bypass through branch I along pipe 139 and pipe 145, and allows operation of the system 100 without the use of the tank 144. This allows the system 100 to remain in operation during maintenance of the tank 144.

C. Circulated and Non-Circulated Water Supply to SS/EW Shower Heads

Water is circulated through branch L to supply the SS/EW heads 160 with heated water. The SS/EW heads are coupled to pipe 149 via pipe 169, pipe 173, a normally open, lockable ball valve 154, pipe 175, and pipe 161. In the illustrated embodiment, the heads (and actuator units) are manufactured by Haws Company of Sparks, Nev. Branch L also contains a balancing valve 188, pipe 187, normally open, lockable ball valve 156 and pipe 157, which intersects pipe 189 of branch K.

The balancing valve 188 in branch L regulates the flow of water in branch L to achieve a substantially constant temperature within the ideal temperature range, as discussed above. The balancing valve 188 is set at or above the minimum flow so that the heat loss in some or all of the pipes 175, 161, 187, 157 under a coldest reasonably anticipated ambient temperature does not cause the temperature of the water at the most downstream shower head 160 to drop below the ideal temperature range.

A balancing valve 190 is connected to pipe 151 and 189 of branch K and is set to allow a flow equal to the capacity of the pump 164 less the flow of the balancing valve 188 set as described above. Branches L and K meet at pipe 177, which is connected to the pump 164 via a normally open, lockable ball valve 162 and pipe 179 in branch J.

The heated water continuously circulates through branch L, which is used to supply shower heads 160. The pipes and fixtures that make up branch L may be subject to ambient temperatures outside the ideal temperature range of the water. Because the water circulates through branch L, the temperature of the water is maintained at or near the ideal temperature range even if temperatures ambient to branch L are outside the ideal temperature range. If desired, some or all of the pipes 175, 161, 187, 157 may be insulated to minimize the heat loss.

In one embodiment, the system 100 can have other dispensing heads, such as shower heads 158 at locations away from the shower heads 160 discussed above. In the illustrated embodiment, the shower heads 158 receive a flow of heated water through pipe 171 and pipe 159 of branch O. If the shower heads 158 are located in areas that may be supplied by pipe 159 having an ambient temperature more closely related to the ideal temperature of the water, it is not necessary to circulate the water through pipe 159 supplying the shower heads 158. Thus, water need not circulate through branch O.

D. Drainage

Periodically draining the tank 144 can help prevent the growth of contaminants, such as *Legionella* bacteria. Thus, the system 100 of the illustrated embodiment contains a drainage subsystem. Branch N makes up the drainage subsystem for the system 100. A normally open, lockable ball valve 146 can isolate the remaining portions of branch N from the circulation portion 101 described above. Pipe 163 connects the normally open, lockable ball valve 146 to a purge valve 148. The purge valve 148 has an integral or external timer (not shown) which triggers its operation.

In one embodiment, the timer opens the normally closed purge valve 148 every 30 days for a duration approximately equal to that necessary to drain an amount of water equal to the capacity of the tank 144. When the purge valve 148 is open, water flows past a flow switch 150 through pipe 165, through pipe 167, and through the purge valve 148 to a drain 152. This allows water to be drained from the tank 144 and can even allow water to be drained from the entire circulation portion 101 of the system 100 and even from branch O, if desired. In the illustrated embodiment, the purge valve 148 is a self-timer, ball valve (120v a.c.), manufactured by Neles-Jamesbury of Worcester, Mass. Other embodiments can use other purge valves. The flow switch 150 and the timer controlling the purge valve 148 are coupled to the alarm 194. If the flow switch 150 does not detect the flow of water when the timer opens the purge valve 148, the alarm 194 signals audibly and/or visually. In the illustrated embodiment, the flow switch 150 is a target flow switch with a dry set of contacts. This flow switch is manufactured by McDonnell & Miller of Chicago, Ill. or Ryan Hero Products Corp. of Burbank, Calif.

The size of the pipes 163, 165, 167 of branch N are not greater than the size of the pipes 111, 113 of branch A in one embodiment, ensuring that water is supplied from the cold water supply 103 as fast as the water is drained through the drain 152. The drain 152 may be connected to a conventional sewer system.

The system 100 of the illustrated embodiment may be mounted on or in a housing 199 to allow the system 100 to be premanufactured and moved to the facility it serves. In other embodiments, the system 100 can be constructed at the facility it serves.

E. Operation

The operation of the system 100 will now be described in connection with the illustrated embodiment. The system 100 is initially filled through branch A. After the system 100 is filled with water, and when no shower heads 158, 160 are activated, water does not flow through branch A. Pressure in branch A is not allowed to flow in the reverse direction of the pump 164 due to a check valve 166 coupled to branch A by pipe 181, pipe 183, a normally closed, like others ball valve 168, and pipe 185. Hot water is allowed to flow through branch B as described above, and if necessary, branch C also as described above, returning through branch D to heat the water flowing through the heat exchanger 132 as necessary according to the description above. The heated water circulates through branches F, G, H, J, K, L and M as described above.

If any of the heads 158, 160 are activated, heated water (within the ideal temperature range) is immediately available at and dispensed from the heads 158, 160. As the heated water is dispensed, pressure in the circulation portion 101 of the system 100 is reduced. The reduced pressure allows a flow of cold water to move through branch A into the circulation portion 100, thereby compensating for the water loss through heads 158, 160. In one embodiment, the cold water introduced into the circulation portion is chlorinated water, which helps inhibit the growth of contaminates, including *Legionella* bacteria and other bacterium. The cold water introduced through branch A may rapidly drop the temperature of the water flowing past the temperature element/controllers 134, 136, which operate as described above to restore the temperature of the water in the circulation portion 101 of the system 100.

When the flow through the heads 158, 160 is terminated, the flow of the cold water through branch A stops, allowing the heat exchanger 132 to increase the temperature of the water to within the ideal temperature range again. As indicated above, the volume of heated water in the tank 144 acts to dampen the fluctuation in temperature of the water in the circulation portion 101, such as when cold water is added from branch A to compensate for the water dispensed from the heads 158, 160.

F. Other Features

Figure 2:
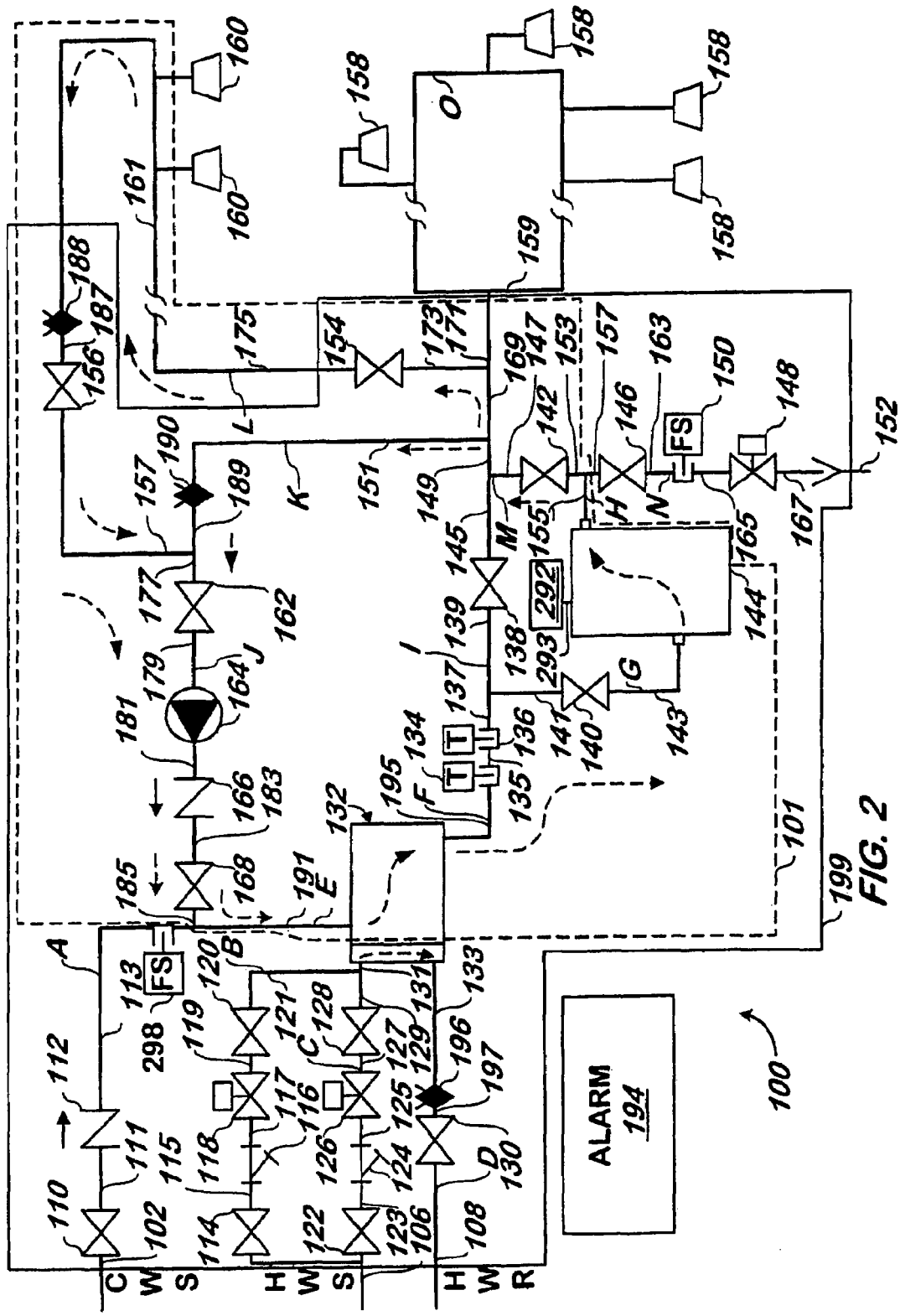
FIG. 2 is a block schematic diagram of the system of FIG. 1 with additional features according to another embodiment of the present invention.

Referring now to FIG. 2, another embodiment of the present invention is shown with additional features. Elements referenced as 1XX (e.g. 102-199) operate as described above with elements numbered 2XX additionally operating as described below.

In one embodiment, if the ambient temperature surrounding pipe 161 in branch L or other pipes is too high, the water in the circulation portion 101 of the system 100 may become overheated, i.e., outside the ideal range. In such embodiment, the temperature element/controller 134 or 136 is coupled to the purge valve 148. The controller of the temperature element/controller 134 or 136 detects this condition and will signal the purge valve 148, through a connection not shown, to purge some of the water from the circulation portion 101 of the system 100. When some of the water is purged, the pressure in the circulation portion 101 of the system 100 is reduced, which will admit cold water from pipe 113. This purging operation will serve to reduce the temperature of the water in the circulation portion 101 of the system 100. In one embodiment, the threshold to purge water from the system 100 may be set at or below the high temperature alarm threshold (e.g., approximately 75 degrees Fahrenheit in the example above) and the purging stops at or above or below the highest high threshold for the control valves 118, 126 although other temperature thresholds may also be used.

In some circumstances, it may be desirable to sound an alarm upon the start of any unexpected cold water flow into the system 100, for example, when a head 158, 160 is activated. In such embodiment, a flow switch 298 similar to the flow switch discussed above is coupled anywhere along branch A, for example, inserted into pipe 113 to detect the flow of cold water into the system 100. The flow switch 298 is connected to the alarm 194, which sounds only if the flow switch 298 in branch A detects incoming cold water when the flow switch 150 in branch N does not detect the outflow of water from the system 100 via the drain 152. Such an occurrence signals a leak in the system 100 or one of the heads 158, 160 being activated.

In one embodiment, an expansion tank 292 is connected to the tank 144 via pipe 293 (which may include inline a normally open, lockable ball valve, not shown to allow isolation of the expansion tank 292 for maintenance purposes) to allow for thermal heat expansion of the water in the circulation portion 101 of the system 100 following the time the circulation portion 101 is filled with cold water, which is then heated as described above. In the illustrated embodiment, the expansion tank 292 is an ST-C Series, FDA-approved steel tank with butyl rubber liner, at least 4.7 total gallons, and at least 3.2 maximum acceptable gallons. This expansion tank is manufactured by Amtrol of West Warwick, R.I.

G. Method

Figure 3:
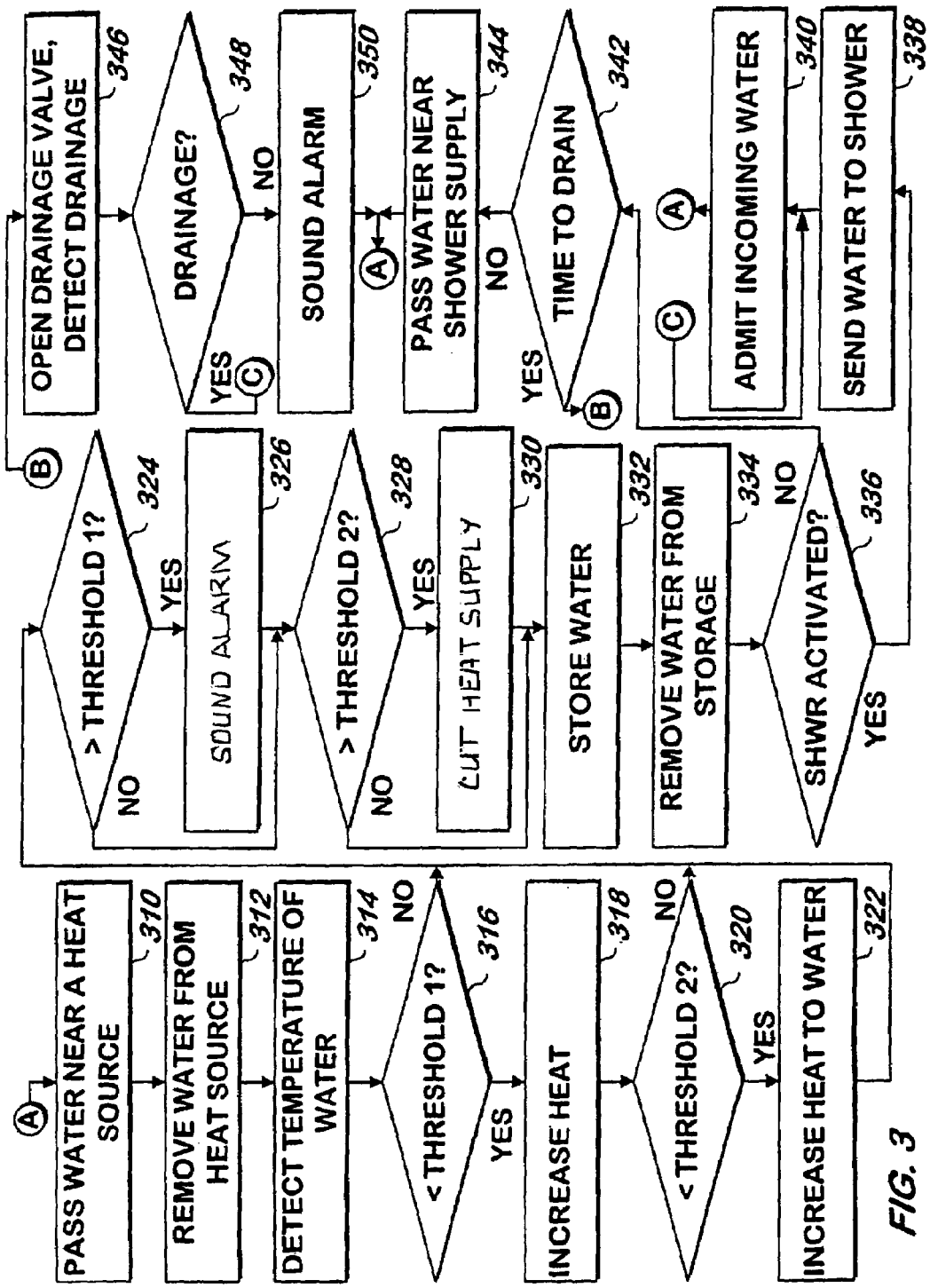
FIG. 3 is a flowchart illustrating a method of supplying water to emergency shower and/or eyewash system heads according to one embodiment of the present invention.

Referring now to FIG. 3, a method of supplying water to one or more SS/EW heads is shown according to one embodiment of the present invention. Water is passed near a heat source 310. The water is removed from the heat source 312. The temperature of the water is detected 314. As described above, step 314 may be performed in two locations or even more than two locations.

If the temperature of the water is below a first threshold 316, the temperature of the water is increased, for example, by increasing heat to the heat source 318 by one amount. Step 318 may be performed by modulating a supply of heat to the heat source according to how far below the first threshold the temperature of the water is detected in step 314 as described above or by using other methods. If the temperature of the water detected in step 314 is below a second threshold 320, which may be greater than, less than or the same as the first threshold, the supply of heat to the heat source is increased 322 by another amount, either equal to, greater than, or less than the first amount, for example by modulating it as described above or using other methods. In one embodiment, the first amount is one-half the second amount.

Figure 4:
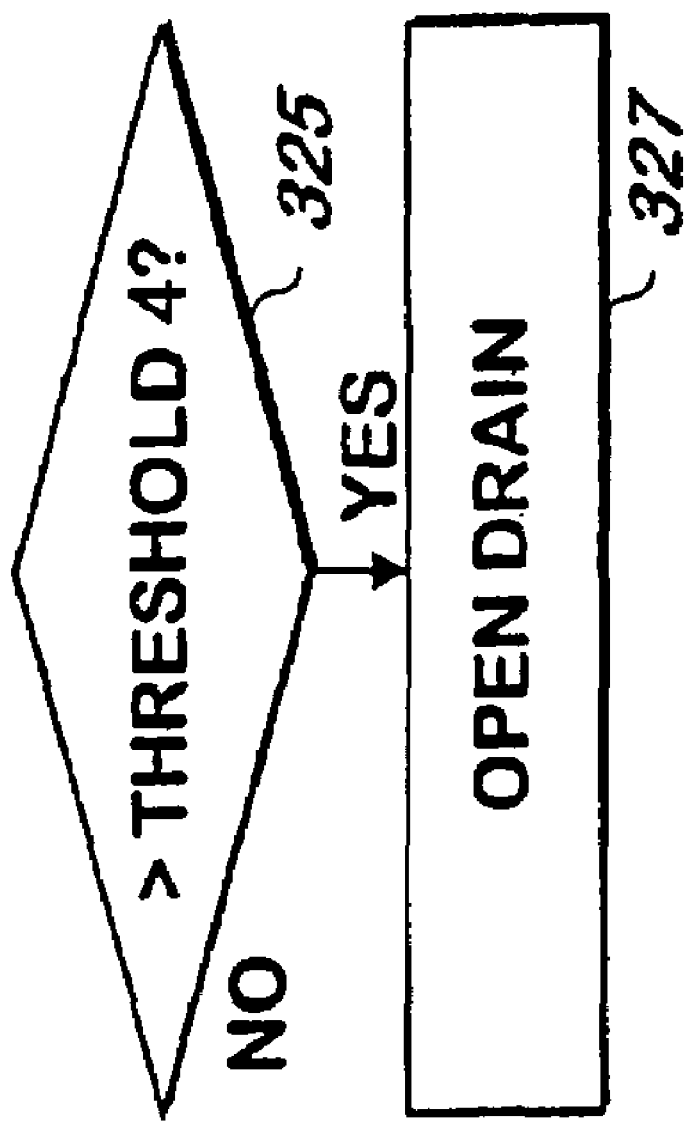
FIG. 4 is a flowchart illustrating additional steps of the method of FIG. 3, the additional steps decreasing the temperature of water according to one embodiment of the present invention.

If the temperature of the water is out of a threshold range of temperatures 324, an alarm may be sounded 326, as described above. If the temperature of the water is above third threshold 328, the supply of heat to the heat source may be cut 330, such as by disconnecting power to one or more of the normally open valves or other heat supplying devices. The third threshold may be higher than the first or second or may be the same or lower than the first or second threshold. Step 326 may include opening a drain to remove some of the water and admit cold water or this step may occur in response to the water temperature detected in step 314 exceeding yet a fourth threshold 325, 327 of FIG. 4 (steps 325, 327 may be inserted between steps 326 and 328 of FIG. 3).

The water having the temperature detected in step 314 is stored 332, for example, in a tank to allow the resulting reservoir of water to absorb rapid changes in temperature of the water. The water is removed from storage 334.

If the shower is activated 336, water is sent to the activated shower 338. Incoming water is admitted 340 to replace the water dispensed in step 338. Step 340 may include setting an alarm as described above. The method continues at step 310.

If the shower is not activated 336, it may be time to drain some of the water as described above. If it is not time to drain some of the water 342, the water may be passed near a supply intake for water for a shower 344 as described above. The method continues at step 310. If it is time to drain water 342, drainage is initiated and drainage may be detected 346. It may be time to drain water every 30 days. If drainage is detected 348, the method continues at step 340. Otherwise, an alarm may be sounded 350, and the method continues at step 310.

The embodiments of the system 100 provide many benefits. The system requires no stabilization period to achieve the ideal temperature, because the temperature-controlled water circulates through the system. The temperature of the water is not dependent on the pressure of the water behind it, because the system circulates water through normally closed loops. The water in the tank will prevent the incorrectly heated water from reaching the shower head at too different a temperature, because water is heated and then placed in a tank before sending it to the shower supply pipes. Water flow out of the ideal temperature range may be detected and an alarm sounded to correct the condition, because the temperature-controlled water circulates near sensors. The system can supply multiple showers at the same time, because no thermostatic mixing valve is used and the tank serves as a temperature reservoir. The system may be pre-manufactured and installed as a unit, because the system can be contained in or on a housing, thereby eliminating quality problems found in systems that must be built on-site.

In addition, the water in the system's pipes can remain inside the ideal temperature range without requiring heat traces on the pipes, so the temperature of the water coming out of the showers will be in the ideal temperature range. The system can in some embodiments use the heat source of a central plant, and water in the system circulates at or near room temperature, which reduces heat loss. Accordingly, the system can be more efficient than systems using a water heater with a thermostatic mixing valve.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

What is claimed is:

1. An emergency water-dispensing system for providing water having a temperature within a temperature range to at least one dispensing head, the system comprising:
   a circulation portion connected to at least one dispensing head, the circulation portion configured to circulate a substantially continuous flow of water through the circulation portion;
   a heat portion connected to a heat source and configured to contain a heated material independent of the water circulating in the circulation portion;
   a heat exchanger connected to the heat portion and to the circulation portion, the heat exchanger configured to heat the water circulating in the circulation portion with heat from the heated material without the water mixing with the heated material; and
   a controller, the controller operatively associated with the circulation portion and the heat portion, the controller, circulation portion, and the heat portion configured to maintain temperatures of the water circulating in the circulation portion within a temperature range at least until a portion of the water circulating in the circulation portion is delivered to at least one dispensing head connected to the circulation portion.

2. The system of claim 1 wherein the circulation portion includes a water inlet connectable to a water source.

3. The system of claim 1, further comprising a housing for containing at least a portion of the circulation portion, the heat exchanger, and the controller, thereby allowing transportation of at least a portion of the system as a unit.

4. The system of claim 1 wherein the circulation portion includes a temperature sensor coupled to the controller and configured to provide water temperature data to the controller.

5. The system of claim 1 wherein the circulation portion has a cold water inlet upstream of the heat exchanger, and a flow sensor coupled to the cold water inlet and configured to detect a flow of water through the cold water inlet portion.

6. The system of claim 1 wherein the circulation portion has a cold water inlet, a flow sensor coupled to the cold water inlet and an alarm coupled to the flow sensor, the alarm being configured to provide an indication responsive to the flow of water through the cold water inlet.

7. The system of claim 1 further comprising a reservoir connected to the circulation portion at a position downstream of the heat exchanger and upstream of the dispensing heads connected to the circulation portion.

8. The system of claim 7 wherein the reservoir is a water storage tank having a tank inlet and a tank outlet through which the water circulates as the substantially continuous flow of water circulates around the circulation portion.

9. The system of claim 7, further comprising:
   a drainage system connected to the circulation portion at a position downstream of the reservoir and upstream of the dispensing heads connected to the circulation portion, the drainage system configured to receive at least a portion of the water in the circulation portion to be drained therefrom, the drainage system having a drainage valve operatively coupled to the controller for movement between open and closed positions.

10. The system of claim 1, further comprising a drainage system connected to the circulation portion and having a drainage valve operatively coupled to the controller for movement between open and closed position, the system including a timer is coupled to at least one of the controller and drainage valve, wherein the drainage valve is configured to move to the open position in response to a signal from the timer.

11. The system of claim 10, wherein the timer is configured to provide a signal for opening the drainage valve at the expiration of a repeated interval.

12. The system of claim 10 wherein drainage system is configured to open the drain valve and allow an amount of water approximately equal to a capacity of the reservoir to be drained from the circulation portion before the drain valve is closed.

13. The system of claim 1 wherein the temperature range has a high temperature value, and heat exchanger heats the flow of water moving therethrough to a temperature no greater than the high temperature value.

14. The system of claim 1, further comprising;
a temperature sensor coupled to the circulation portion to determine the temperature of the water flowing therethrough; and
a drainage valve coupled to the circulation portion, the drainage valve being movable to an open position to drain water from the circulation portion in response to a signal from the temperature sensor indicating that the temperature of the water in the circulation portion exceeds a threshold temperature.

15. The system of claim 1 wherein the heated material is hot fluid, and the heat portion includes a fluid circuit having an inlet and an outlet through which the hot fluid flows, at least a portion of the fluid circuit carries the hot fluid through the heat exchanger.

16. The system of claim 15, wherein the circulation portion includes a temperature sensor downstream of the heat exchanger and upstream of the dispensing heads connected to the circulation portion, the temperature sensor configured to provide a signal relating to the temperature of the water in the circulation portion adjacent to the temperature sensor, and the heat portion includes at least one valve connected to the fluid circuit and configured to control the flow of the hot fluid through the fluid circuit, the valve being movable between open and closed positions in response to the signal from the temperature sensor.

17. The system of claim 1 wherein the heat portion includes a heated fluid circuit having an inlet and an outlet through which the heated material flows, at least a portion of the heated fluid circuit is connected to the heat exchanger, the heated fluid circuit includes a plurality of valves coupled to one another in parallel, the valves having a plurality of capacities.

18. The system of claim 1, further comprising a temperature sensor connected to the circulation portion to sense the temperature of the water circulating through the circulation portion and an alarm coupled to the temperature sensor to indicate if at least a portion of the water in the circulation portion is outside of a temperature range.

19. The system of claim 1, further comprising at least one SS/EW head connected to the circulation portion by pipes exposed to ambient outdoor temperatures.

20. The system of claim 1 wherein at least a portion of the circulation portion includes at least one pipe exposed to ambient outdoor temperatures.

21. An emergency water-dispensing system for providing water having a temperature within a temperature range to at least one dispensing head, the system connectable to a water source and a separate heat source, the system comprising:
a circulation portion having a water inlet connectable to the water source and a water outlet coupled to the dispensing head, and a reservoir intermediate the water inlet and the water outlet, the circulation portion configured to circulate a substantially continuous flow of water therearound at a temperature above room temperature at least until a portion of the flow of water is delivered to the dispensing head;
a heat portion connectable to the heat source and configured to contain a heated material independent of the water in the circulation portion;
a heat exchanger connected to the heat portion and to a portion of the circulation portion upstream from the reservoir, the heat exchanger configured to heat the flow of water moving therethrough with heat from the heated material without the flow of water mixing with the heated material and before the flow of water is delivered to the dispensing head; and
a controller connected to the circulation portion and configured to control the flow of water through the circulation portion to maintain the temperature of the water in a temperature range.

22. An emergency water-dispensing system for providing temperature-controlled water to at least one dispensing head, the system comprising:
a circulation portion having a water inlet connectable to a cold water source and connected to at least one dispensing head, the circulation portion configured to circulate a substantially continuous flow of water therearound;
a pump connected to the circulation portion and positioned to circulate the water through the circulation portion;
a hot fluid circuit connectable to the hot fluid source and fluidly isolated from the circulation portion;
a heat exchanger connected to the hot fluid circuit and to the circulation portion;
a temperature sensor connected to the circulation portion and configured to sense the temperature of the water in the circulation portion; and
a controller coupled to the temperature sensor, the controller, circulation portion, and the hot fluid circuit configured to maintain temperatures of the water circulating in the circulation portion within a temperature range at least until a portion of the water circulating in the circulation portion is delivered to at least one dispensing head connected to the circulation portion.

23. The system of claim 22 further comprising a reservoir connected to the circulation portion at a position downstream of the heat exchanger and upstream of the dispensing heads connected to the circulation portion.

24. The system of claim 22, further comprising a housing for containing at least a portion of the circulation portion, the heat exchanger, and the controller and a unit.

25. The system of claim 22 wherein the circulation portion includes a flow sensor coupled to the water inlet and configured to detect a flow of water through the water inlet.

26. The system of claim 22 wherein the circulation portion includes a flow sensor coupled to the water inlet and an alarm coupled to the flow sensor, the alarm being configured to provide an indication responsive to the flow of water through the water inlet.

27. The system of claim 22, further comprising a drainage system connected to the circulation portion at a position downstream of the heat exchanger and upstream of the dispensing heads connected to the circulation portion, the drainage system configured to receive at least a portion of the water in the circulation portion to be drained therefrom.

28. The system of claim 22, further comprising a drainage system connected to the circulation portion and having a drainage valve operatively coupled to the controller for movement between open and closed position, the system including a timer is coupled to at least one of the controller and drainage valve, wherein the drainage valve is configured to move to the open position in response to a signal from the timer.

29. The system of claim 22, further comprising a drainage valve coupled to the circulation portion, the drainage valve being movable to an open position to drain water from the circulation portion in response to a signal from the temperature sensor indicating that the temperature of the water in the circulation portion exceeds a threshold temperature.

30. The system of claim 22 wherein the temperature sensor is configured to provide a signal relating to the temperature of the water in the circulation portion adjacent to the temperature sensor, and the heat portion includes at least one valve connected to the fluid circuit and configured to control the flow of the hot fluid through the fluid circuit, the valve being movable between open and closed positions in response to the signal from the temperature sensor.

31. The system of claim 22, further comprising an alarm coupled to the temperature sensor to indicate if at least a portion of the water in the circulation portion is outside of the temperature range.

32. The system of claim 22 wherein at least a portion of the circulation portion includes at least one pipe exposed to ambient outdoor temperatures.

* * * * *